United States Patent [19]

Reynolds

[11] Patent Number: 4,631,884
[45] Date of Patent: Dec. 30, 1986

[54] BUILDING SYSTEM

[76] Inventor: Donald A. Reynolds, Gypsy Mead, Westcliffe Avenue, Baildon, Shipley, West Yorkshire, England

[21] Appl. No.: 828,296

[22] Filed: Feb. 11, 1986

Related U.S. Application Data

[63] Continuation-in-part of Ser. No. 597,586, Apr. 9, 1984, abandoned, which is a continuation of Ser. No. 351,133, Feb. 22, 1982, abandoned.

[30] Foreign Application Priority Data

Feb. 21, 1981 [GB] United Kingdom ................. 8105556

[51] Int. Cl.⁴ .............................................. E06B 3/62
[52] U.S. Cl. ........................................ 52/235; 52/464
[58] Field of Search ................. 52/235, 464, 476, 716, 52/466

[56] References Cited

U.S. PATENT DOCUMENTS

| 3,081,849 | 3/1963 | Hubbard | 52/464 |
| 3,455,080 | 7/1969 | Meadows | 52/476 |
| 3,866,374 | 2/1975 | Dallen | 52/235 X |
| 3,918,231 | 11/1975 | Kessler | 52/476 X |
| 3,998,024 | 12/1976 | Frandsen | 52/809 |
| 4,067,155 | 1/1978 | Ruff et al. | 52/466 X |
| 4,069,641 | 1/1978 | DeZutter | 52/716 X |

FOREIGN PATENT DOCUMENTS 2023703 1/1980 United Kingdom ................. 52/476

*Primary Examiner*—J. Karl Bell
*Attorney, Agent, or Firm*—Henry Sternberg; Bert J. Lewen

[57] ABSTRACT

A building of one of to three levels therein having a curtain wall system for cladding the building. The curtain wall system having an auxiliary framework of the building and having a plurality of infills defining the exterior finish of the building seated in the auxiliary framework with elongated exterior finishing gasket means locking the infills in place.

6 Claims, 11 Drawing Figures

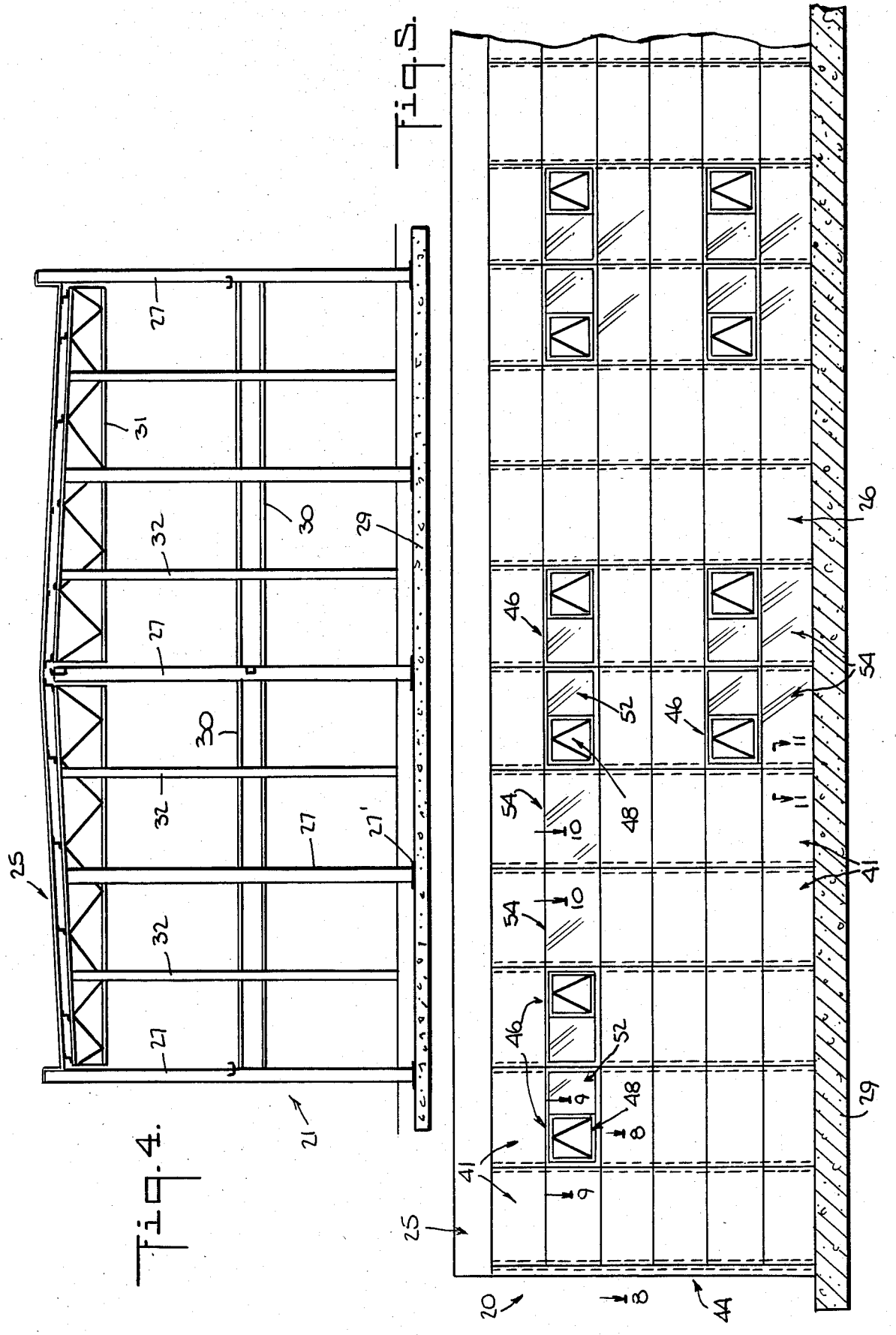

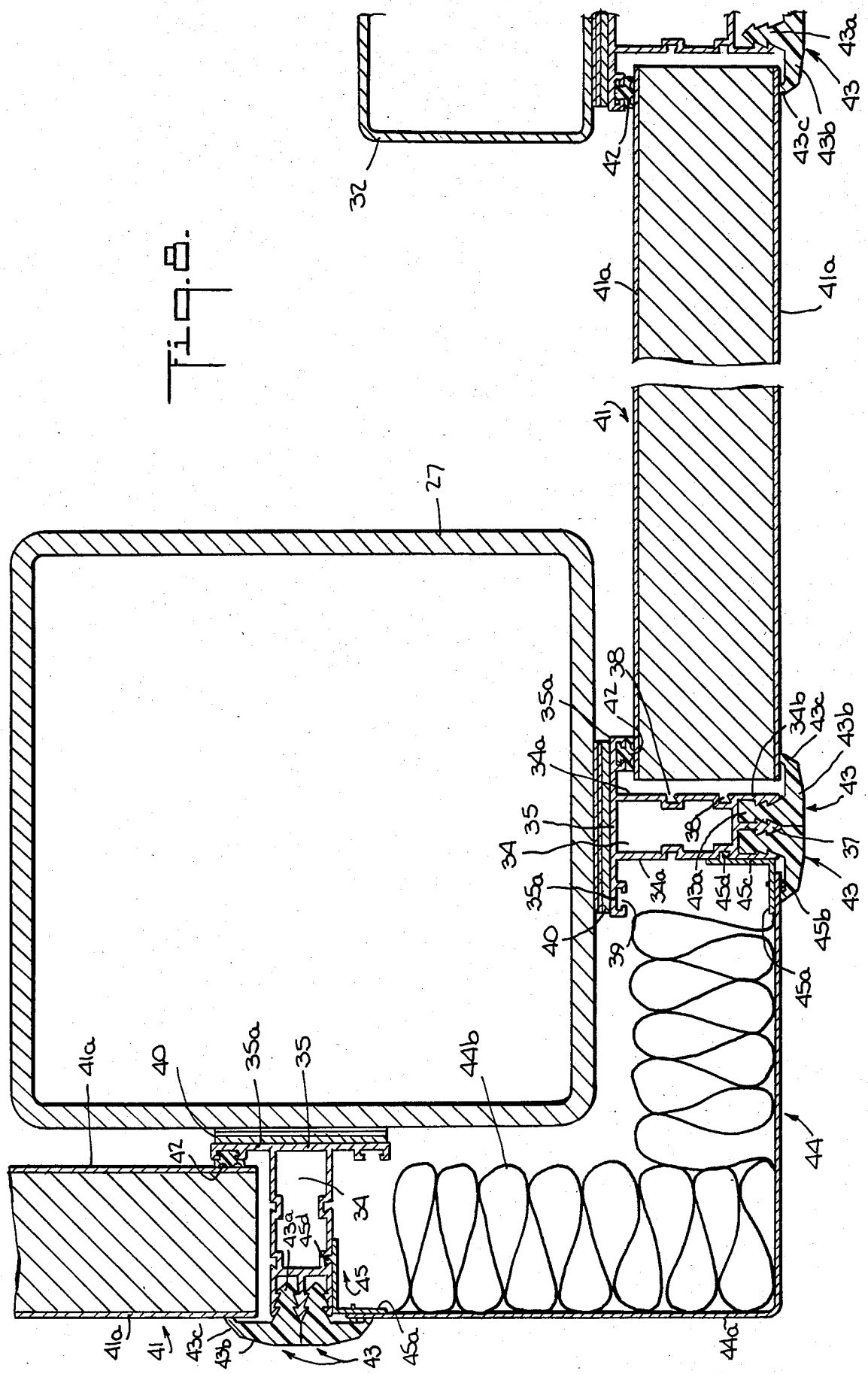

BUILDING SYSTEM

This application is a continuation-in-part of my prior copending application Ser. No. 597,586 filed Apr. 9, 1984 now abandoned, which in turn is a continuation of my prior application Ser. No. 351,133, filed Feb. 22, 1982 and now abandoned, the entire disclosure of both of which applications is incorporated in the present application by this reference.

BACKGROUND OF THE INVENTION

This invention relates to low buildings having perhaps one or two, and possibly three, levels therein, and in particular to a curtain wall system for the cladding of such low buildings.

In my published British Patent Specification No. 2,023,703A, there is disclosed an arrangement for mounting infills, that is, glass panels, opaque wall panels, or the like, to provide the external cladding of a building. In that arrangement, each infill is mounted within an auxiliary framework which is attached to the main structural framing or "steelwork" of the building to be clad. Thus the main steelwork must be sufficently strong to be able to support both the auxiliary framework and the cladding. Moreover, not only is the main steelwork required to be of robust construction, and therefore heavier and more expensive, but the bulk of the auxiliary framework would necessarily be visible from inside the building unless an internal wall is constructed, which again adds to the overall expense of the building.

BRIEF DESCRIPTION OF THE INVENTION

The present invention seeks to provide a novel and improved construction of a low building including a curtain wall system which allows the building to be erected quickly—often several times more quickly than with traditional building methods—and economically, and with flexibility for subsequent alterations and/or extension.

According to the present invention there is provided a low building including a curtain wall system which comprises an auxiliary framework attached to the main steelwork of the building and made of a plurality of framework members. Each such framework member has a generally T-shaped cross-section and includes an elongated central support portion defining a pair of opposed shoulders for seating, respectively, the proximate edges of a pair of adjacent infill panels, a relatively thin transverse web at one edge of the support portion and defining a pair of lateral flanges or abutments, and at the other edge of the support portion a channel generally parallel with the support portion and shaped to receive and grip the foot of a flexible gasket, the gasket also having a transverse limb which includes a rib or like projection adapted to extend toward or over the associated shoulder to bear against the respective infill. The thickness of any given infill may be substantially the same as the cross-sectional length of a support portion of an associated framework member, i.e. as the width of the shoulder of that member from the flange thereof to the free end of the associated channel portion, or its thickness may be somewhat or even considerably less than that length, depending on the nature and purpose of that infill. In general, however, those infills which constitute the opaque wall portions of the cladding will have physical properties (thickness and structural strength) which are sufficient to complement those of the framework members, whereby the latter may be reduced in physical size. In particular, the integral structural box configuration or like structural form which is usually utilized for at least the vertical frame members of the known curtain wall system may be omitted, with great cost savings.

In such an arrangement, therefore, with an upper vertically disposed infill panel seating on edge on the upper of the two horizontal shoulders of a horizontal framework member, and a lower vertically disposed infill panel seating on edge adjacent the lower of the two horizontal shoulders, the weight of the upper panel and other forces on such panel, such as wind forces, etc., will be transmitted, at least in part, through the framework member to and will be, at least in part, supported by the lower panel, and so on down the line.

Thus, the fact that ordinarily the relatively thick infills sit squarely on and substantially fully occupy the shoulders of the framework members contributes greatly to the overall strength of the system. In effect, the system "picks up" strength from the infill panels, and does not rely solely on the strength of the auxiliary framework as has been the case with previous systems. As is shown in my aforesaid British Patent Specification, such systems usually used relatively thin infill panels, but where, specifically, thicker panel were employed these were rebated, i.e. reduced in thickness, around their edges to fit the relatively narrow shoulders hitherto employed. This rebating added cost and did not exploit, or even recognize, the contribution of the panels to the overall strength of the system. Expensive box section reinforcements continued, therefore, to be used in the auxiliary framework members, in at least one direction.

In constructing a building according to the present invention, the initial stage includes erecting a basic structural steelwork and roofing the steelwork. Then the auxiliary framework members are affixed to the steelwork, and infills are mounted in the framework to form the walls of the building. The primary part of the building construction is, therefore, conventional, i.e. the foundation is dug, a concrete base is laid, the structural steelwork is erected, and a roof is fixed to the steelwork, as are intermediate floors, if any. Thereafter, the auxiliary framework of the system of the invention is attached to the steelwork and the infill panels are put in place and secured to the framework by the exterior gaskets.

One advantage of the present invention thus is that the system permits very quickly finishing the building externally and thereby protecting internal tradesmen, e.g. electricians, decorators, and so on, from the weather. Another advantage of the system is that the spacing of the vertical load-bearing components of the structural steelwork can be greater than has hitherto been the case, again reducing cost, since the system of the invention is strong enough to permit the use of infills bridging relatively wide spans between locations of attachment of the auxiliary framework members to the steelwork. The system of the invention is also extremely light. Buildings using such a system can therefore be erected on sites where conventional buildings would have been too heavy for the substrate.

It should be pointed out here, by way of definition, that the term "infill" as used herein means a construction panel, glazing unit, or the like, which is capable of being used as cladding, i.e. to constitute at the same time both the external and the internal walling for a building. The infills, which may be solid or hollow, should be manufactured so as to have correct thickness. The actual construction of the infills can vary widely according to specifications and cost, to enable a wide variety of external and internal appearances, heat and sound insulating qualities, light transmissions, and so forth, to be obtained.

A preferred form of infill, whether for use as a wall unit or as a glazing unit, is a construction panel which is sufficiently rigid to have the necessary structural strength to complement that of the auxiliary framework, has the desired heat and/or sound insulation properties, has the necessary weatherproof external finish, and also has a desired internal finish suitable to end-use of the building. The internal finish on a wall unit thus can include painted or laminated surfaces or even coverings of fabric or other decorative finishes.

A particularly preferred infill for a wall unit is constructed from a block of framed plastics material, e.g. polystyrene to which are adhesively bonded rigid covering sheets, e.g. of steel. The adhesive employed is preferably a polyurethane variety for strength. The steel sheets may themselves be laminates, bearing the surface finishes desired for the external and internal facing. Such infills have the necessary structural and insulation properties, yet are light in weight.

As previously indicated, the present invention basically contemplates the use of infill panels of different thicknesses as parts of the cladding, e.g. panels of greater thickness for opaque wall sections and panels of lesser thickness for window or vent sections, as well as the use of panels all of the same thickness (i.e., either the greater or the lesser) for the wall sections as well as the window or vent sections. It is further contemplated to provide also for the possibility of using for either type of cladding section (or for both types) infill panels of an intermediate thickness. In order to achieve the greatest economies in the manufacture of the auxiliary framework members, however, and to simplify their installation on the main steelwork, it is deemed appropriate to have the auxiliary framework members all of one and the same size and shape, irrespective of the thicknesses of the infill panels to be mounted thereon.

To this end, each such member is provided on each of the opposed shoulders defined by its central support portion with a respective set of two elongated notches or like recesses extending longitudinally of the member at predetermined spacings from the associated transverse edge flange thereof, and each member is further provided on the front face of each of those flanges (i.e., that face thereof which is directed toward the channeled end of the member), preferably at the outer marginal edge region of that face, with a respective single longitudinally extending elongated notch or like recess. Where the framework member provides support for an infill panel of the greatest thickness, of course, the shoulder notches are not needed and are not used, but the corresponding flange notch can be used to serve as a mounting for a sealing gasket strip intended to engage the rear or interiorly directed face of the infill panel at the edge region of the latter juxtaposed to that flange. On the other hand, in order to enable the framework member to accommodate either an infill panel of least thickness or one of intermediate thickness, the various notches on either side of that member are designed to be used in pairs, with each pair consisting of the respective flange notch and one or the other of the associated shoulder notches, to receive appropriately configured feet or like projections of a suitable adapter which may be a larger or smaller resilient clip or spacer element which, when mounted in place, takes up the portion of the space in front of the flange not occupied by the infill panel and is itself provided at its front end with a notch or recess structure corresponding to the flange notch for receiving the panel-engaging sealing gasket strip.

The gaskets are preferably of a material such as silicone rubber. This has superior temperature stability and excellent durability. Furthermore, since silicone can be self-colored, the finishing gaskets which are applied to the horizontal and vertical juncture regions of the various laterally adjacent infill panels can be so modified in order to enable visually striking effects to be obtained.

The finishing gasket location and sealing arrangement are generally similar to those disclosed in my aforesaid prior U.S. patent applications the disclosures of which have been incorporated herein by reference, and also to those disclosed in my hereinbefore mentioned published British Patent Specification No. 2,023,703A, the disclosures of which are likewise incorporated herein by this reference. It will be apparent, therefore, that in the system of the present invention, in contrast to many other cladding systems, each infill is independently supported and secured in place and hence can be removed or replaced without any need to disturb adjacent infills. This greatly increases the flexibility of a building made utilizing a cladding system according to the present invention.

A building constructed according to the invention is relatively inexpensive since the cladding system is extremely light, depending in large measure on the support provided by the infill panels themselves. These panels are relatively "self-supporting," thereby enabling the number of load-bearing members of the basic structural steelwork to be reduced in quantity and size. This goal is achieved by spacing the heavy vertical load-bearing (roof-supporting) members of the steelwork, which may be in the form of I-beams or rigid square hollow sections (typically 200 mm×200 mm), farther apart than customary, i.e. more than 3 meters center-to-center apart, and by concomitantly interposing between adjacent heavy vertical load-bearing members respective lighter vertical column members, also of steel and preferably in the form of rigid square hollow sections (typically 80 mm×80 mm), to serve as "wind posts" for taking up wind-generated forces or loads exerted on the wall structure. The structural members of the infill-supporting auxiliary framework of the present invention, which preferably are made of extruded aluminum, are fastened at their flanged ends to the respective load-bearing and wind post column members by means of bolts, screws, rivets or like elements. Thus, overall building labour is reduced, a result which is still further enhanced owing to the prefabrication of the infill panels. Furthermore, the so-called "wet-trades", for example brick laying, plastering, rendering, and the like, are virtually eliminated. Infills are interchangeable, thereby giving flexibility in the positioning of windows, entrances and design features. Similarly, the building can be easily extended, should the need arise. A further advantage of the system of the invention is that the walls can be assembled extremely quickly, thus facilitating early weatherproofing of the interior of the building in a short time and allowing internal work to be carried out later under cover and unaffected by the elements.

It should be noted that in any set of vertically aligned infills or wall panels, substantially the entire weight of the uppermost infill is supported by the underlying horizontal support portion of a framework member which in turn is substantially supported by the next lower infill, and so on. In this regard, however, it will be understood that some of the infills in the system of the invention, namely, the glazing panels, ordinarily will not have the strength of the preferred relatively thick wall-forming infill panels. Accordingly, either an upper limit on the number of glazing panels used in a given area may have to be imposed, or additional strengthening of the glazing panels or their frames may have to be employed.

BRIEF DESCRIPTION OF THE DRAWINGS

The invention will be described further, by way of example, with reference to the accompanying drawings, in which:

FIG. 4 is an end elevational view of the structure shown in FIG. 3, the view being taken from the left-hand side of FIG. 3;

FIG. 5 is a fragmentary diagrammatic side elevational view of a completed building in accordance with the present invention and shows a variety of infills secured to the steelwork by an auxiliary framework according to the present invention;

FIG. 8 is a fragmentary sectional view, taken along the line 8—8 in FIG. 5, of a corner region of the building wall;

DETAILED DESCRIPTION OF THE INVENTION

Figure 1:
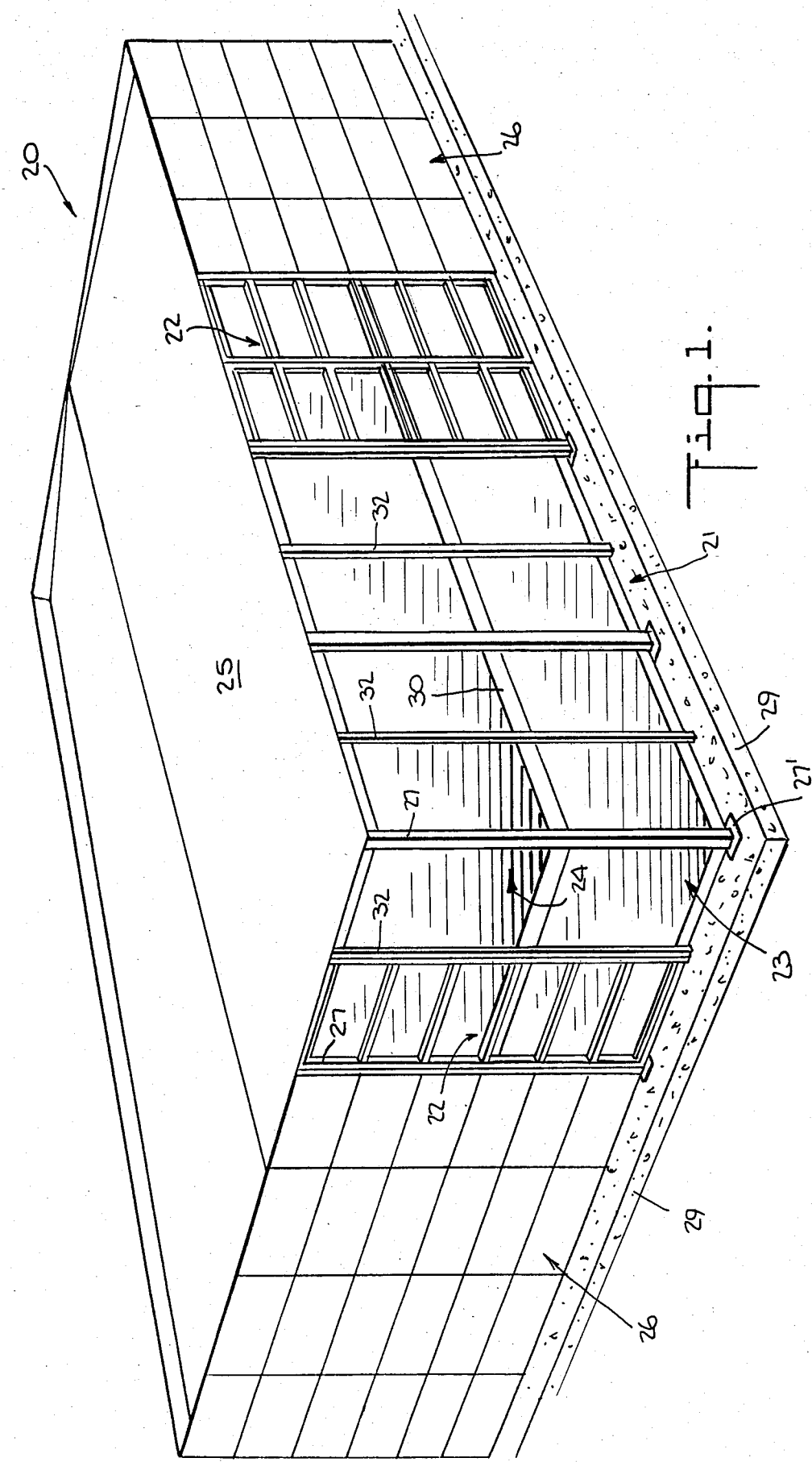
FIG. 1 is a diagrammatic perspective illustration of a building according to the present invention, with some sections of the steelwork being shown prior to the mounting of auxiliary framework members and infills thereon.

Referring now to the drawings in greater detail, a low building 20 according to the invention is shown in FIG. 1, the building including a main steelwork 21, an auxiliary framework 22 (which is illustrated as not yet completed) attached to the exterior of the steelwork, floors 23 and 24, a roof 25, and cladding 26 (see also FIG. 5) which is mounted on the auxiliary framework and defines both the exterior and the interior wall surfaces of the building.

Figure 2:
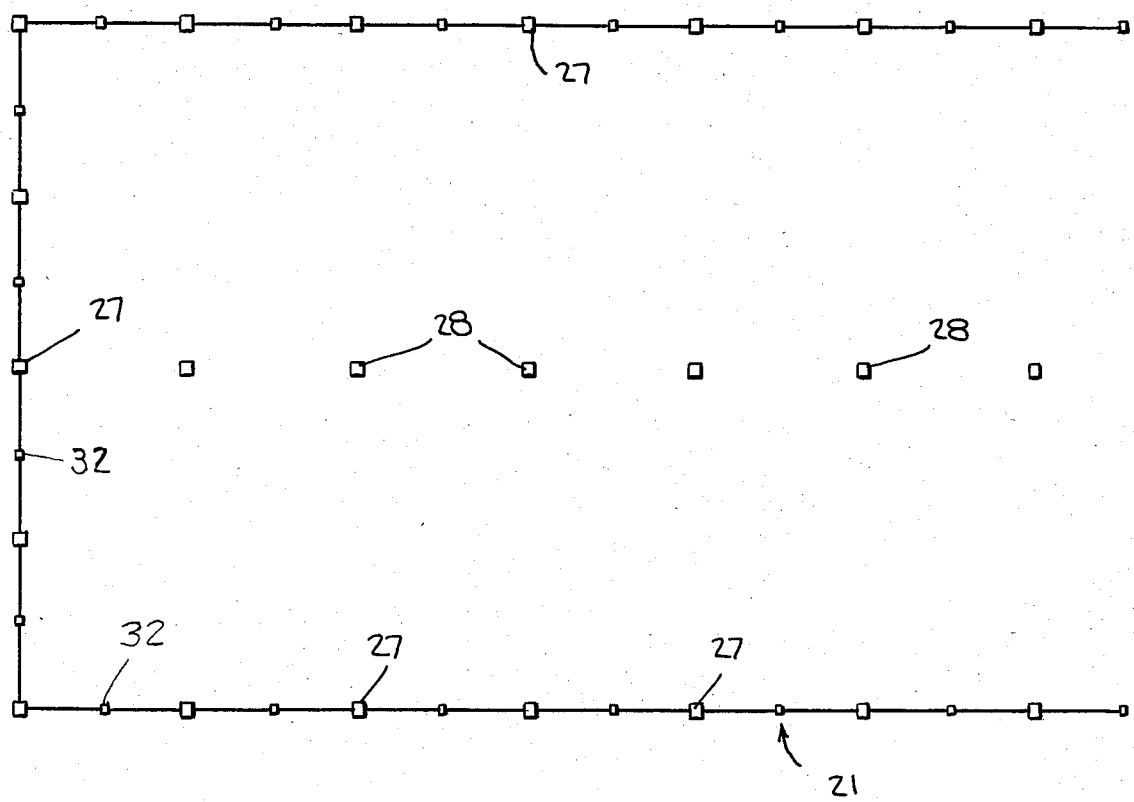
FIG. 2 is a fragmentary diagrammatic top plan view of the basic steelwork layout of the building, showing the alternating arrangement of the primary vertical columns and the secondary vertical columns, i.e. of the roof-supporting girders and the wind posts.
Figure 3:
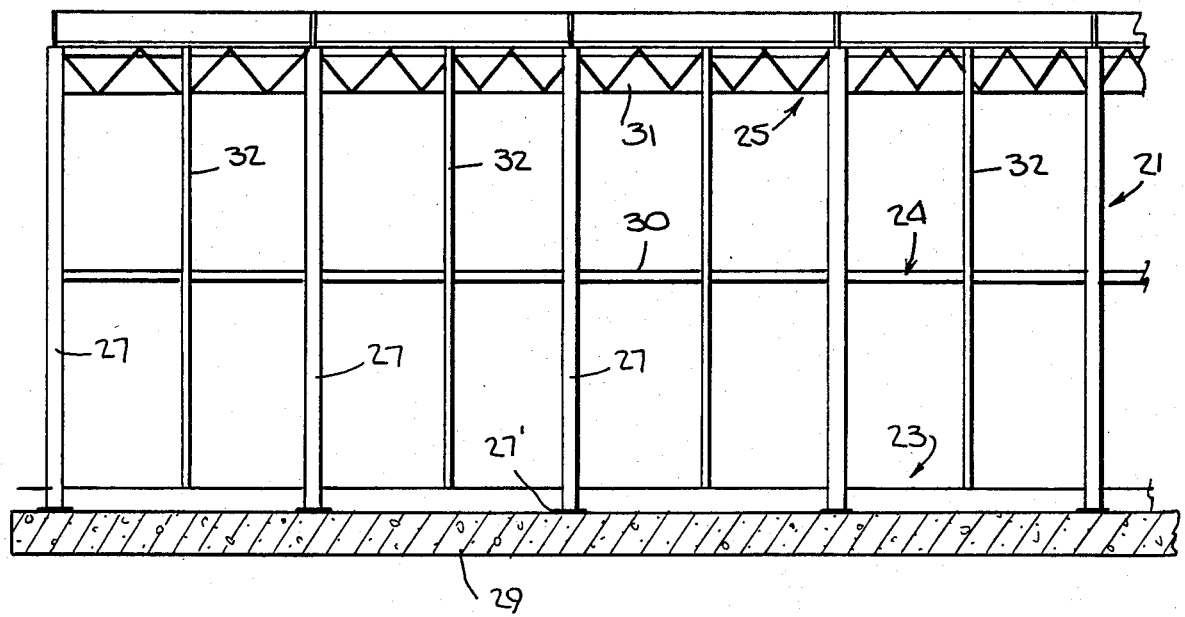
FIG. 3 is a fragmetary side elevational view of the steel-steelwork, showing the same with the roof and floor beams supported thereby.

More particularly, the steelwork 21 includes a plurality of vertical girders or roof support columns 27 (FIGS. 2 to 4) at the outer boundary lines of the building and, to the extent necessary, a plurality of additional girders or roof support columns 28 (FIG. 2) disposed along one or more predetermined lines in the interior of the building. The girders, which in the illustrated embodiment are square sections (although I-beams or other appropriate sections could be used as well), are securely mounted on a concrete base 29 with the aid of base flanges 27' and suitable anchors (not shown), and at the requisite elevations above the base they support the horizontal girders 30 and 31 for the upper floor (or floors) 24 and the roof 25. Typically, the vertical columns 27, when in the form of square sections for use in the construction of a 2-level office building as shown, are made of 8 mm thick steel, measure 200×200 mm in cross-section, have base flanges measuring 400×400 mm with anchor holes in the four corners at 50 mm spacings from the adjacent base edges, and are arranged at 4.3 m center-to-center spacings from each other.

The specifications for these columns can vary, of course, depending on the type and size building being constructed and its intended use and load requirements, e.g., whether it will be a storage facility, a department store, a factory, a meeting hall, etc. However, since these factors, which will likewise determine the requisite specifications for the horizontal girders, the inner and perimeter tie members, the concrete base, and any other components of the main steelwork structure, are matters with which those skilled in building design and construction are quite familiar, they will not be further discussed in any great detail herein.

It should be noted, at this point, that for the purposes of a curtain wall building of the type herein contemplated, it is considered that, in respect of ability to withstand normal wind forces (plus safety margins), 3 m is the maximum permissible span over which an infill panel (still to be described) constituting a part of the cladding can extend between adjacent auxiliary framework members without intermediate backing or support. Thus, it is apparent that the spacing between the adjacent vertical load-bearing columns 27 of the illustrated main steelwork 21 is greater than the permissible maximum. Accordingly, the steelwork 21 is modified to include, midway between each two adjacent vertical roof support columns 27, a respective somewhat lighter vertical column 32 to serve as a wind post. Typically, since these wind posts will not have to bear any part of the load of the building but will serve only to help support the auxiliary framework and the cladding and to resist and absorb wind-generated forces, the columns 32 in the illustrated building, if in the form of square sections, can be made of 3.6 mm thick steel and measure 80×80 mm in cross-section, and can be affixed to the beams 30 and 31 and to the ground flooring 23 in any suitable manner, e.g., by rivets, bolts, welding, or the like. Each wind post 32, therefore, is located at a 2.15 m center-to-center spacing from the two adjacent roof support columns 27.

Figure 6:
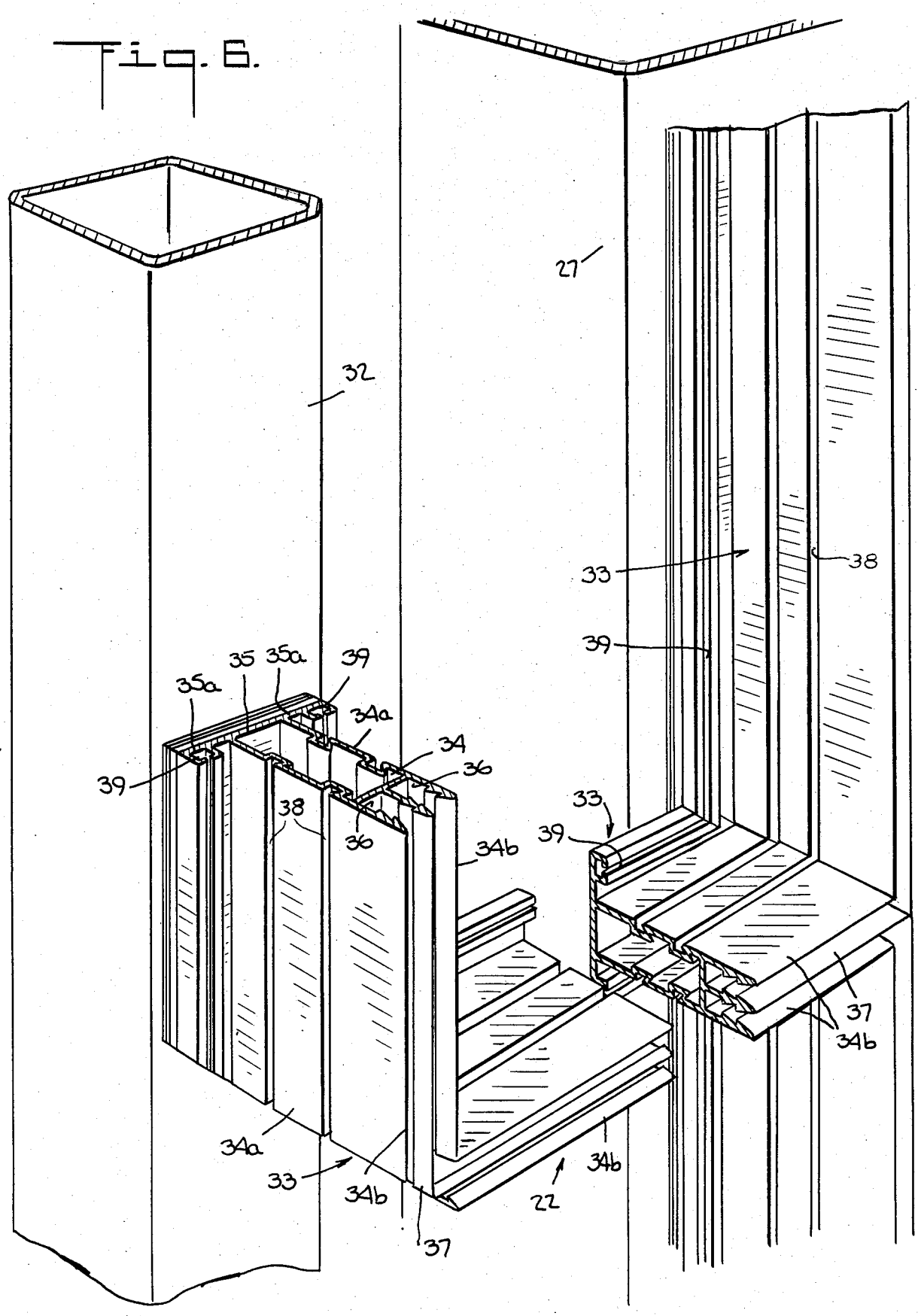
FIG. 6 is a fragmentary perspective view, partly in section, of infill-mounting auxiliary framework members secured to steelwork columns.

The auxiliary framework 22, which in FIG. 1 is shown as not yet being complete in one corner region of the building, includes a plurality of identical framework members 33 some of which are arranged horizontally and others vertically (see FIG. 6). In its basic form, each such framework members has a generally T-shaped cross-section and includes an elongated central support portion 34 rectangular cross-section the opposed side walls of which define a pair of planar shoulders 34a, and a relatively thin transverse web 35 at one edge of the support portion cross-section to define a pair of lateral flanges 35a. At the other edge of the support portion cross-section, two channels 36 are defined between a pair of extensions 34b of the shoulder-forming walls and an intermediate partition 37 extending from the proximate edge wall of the support portion cross-section. The confronting surfaces of the channel walls are inwardly rearwardly toothed or serrated, for a purpose to be more fully explained presently. The outer surfaces of the shoulders 34a of the support portion of each auxiliary framework member 33 are provided with respective pairs of parallel, longitudinally extending undercut notches or like recess structures 38, and the front face of each of the flanges 35a is provided, preferably in the region of its laterally outwardmost edge, with a respective longitudinally extending undercut notch or like recess structure 39, the purposes of which will likewise become clear as the description proceeds. The framework members 33, which are preferably mitered at their opposite ends to facilitate their proper interfitting with respectively transversely extending framework members at the regions of intersection thereof, are secured to the steelwork columns, i.e. the roof support girders 27 and the wind posts 32, at the front faces of the same, i.e. their sides located on the lines defining the periphery of the building, by means of rivets, bolts or self-tapping screws (not shown) driven through the flanges 35, either in the regions of the notches 39 or in the regions between theose notches and the adjacent support portion shoulders 34a, and the respective shims 40 interprosed between the flanges and the front faces of the steelwork columns.

The cladding 26 (see FIG. 5) includes a variety of different types of infills or panels. Of these, the ones which are designated 41 (see also FIG. 8) are opaque, suitably colored on both faces thereof, provide the desired interior and exterior wall finishes, and are constructed in a form and/or of materials (e.g. of a suitable synthetic plastic and either solid with insulation such as foam, fibers or the like incorporated in the material, or hollow with insulation filling the interior cavity, and in either case of a thickness substantially the same as the width or cross-sectional length of the support portion 34 of a framework member 33) to provide the desired physical strength and thermal insulating function. The panels 41 preferably also have sheet metal skins 41a at their exterior and interior faces for added strength (the skins could even be extended over the opposite end edges of the panels but by the same token may be omitted entirely if the intrinsic strength of the panels is sufficient), with the desired coloring or design features being applied to such sheet metal skins by painting, lamination, or otherwise.

As can best be visualized from FIG. 8 in conjunction with FIG. 6, each infill panel 41 is disposed with its long dimension oriented horizontally, the lower side edge of the panel resting on the upper shoulder 34b of the support portion 34 of a horizontal framework member 33 secured at its opposite ends to and extending between a roof support column 27 and wind post 32, the upper side edge of the panel being in engagement with the lower shoulder 34b of the support portion 34 of the next higher horizontal framework member 33 (not shown in FIG. 6 but discernable in FIG. 7), and the vertically disposed opposite end edges of the panel confronting and being closely juxtaposed to the respective proximate shoulders 34b of a pair of vertically oriented framework members 33 secured, intermediate the two horizontal members 33, one to the column 27 and one to the windpost 32. It should be noted, in this regard, that the end edges of the panel 41 are shown in FIG. 8 as being spaced somewhat from the associated vertical support portion shoulders 34a, so as to be able to accommodate a certain degree of thermal expansion. Peripherally along its face directed inwardly of the building, each infill panel 41 is engaged by four resilient gaskets or sealing strips 42 each anchored in a respective one of the four notches or recesses 39 on the flanges 35a of the framework members 33.

Figure 7:
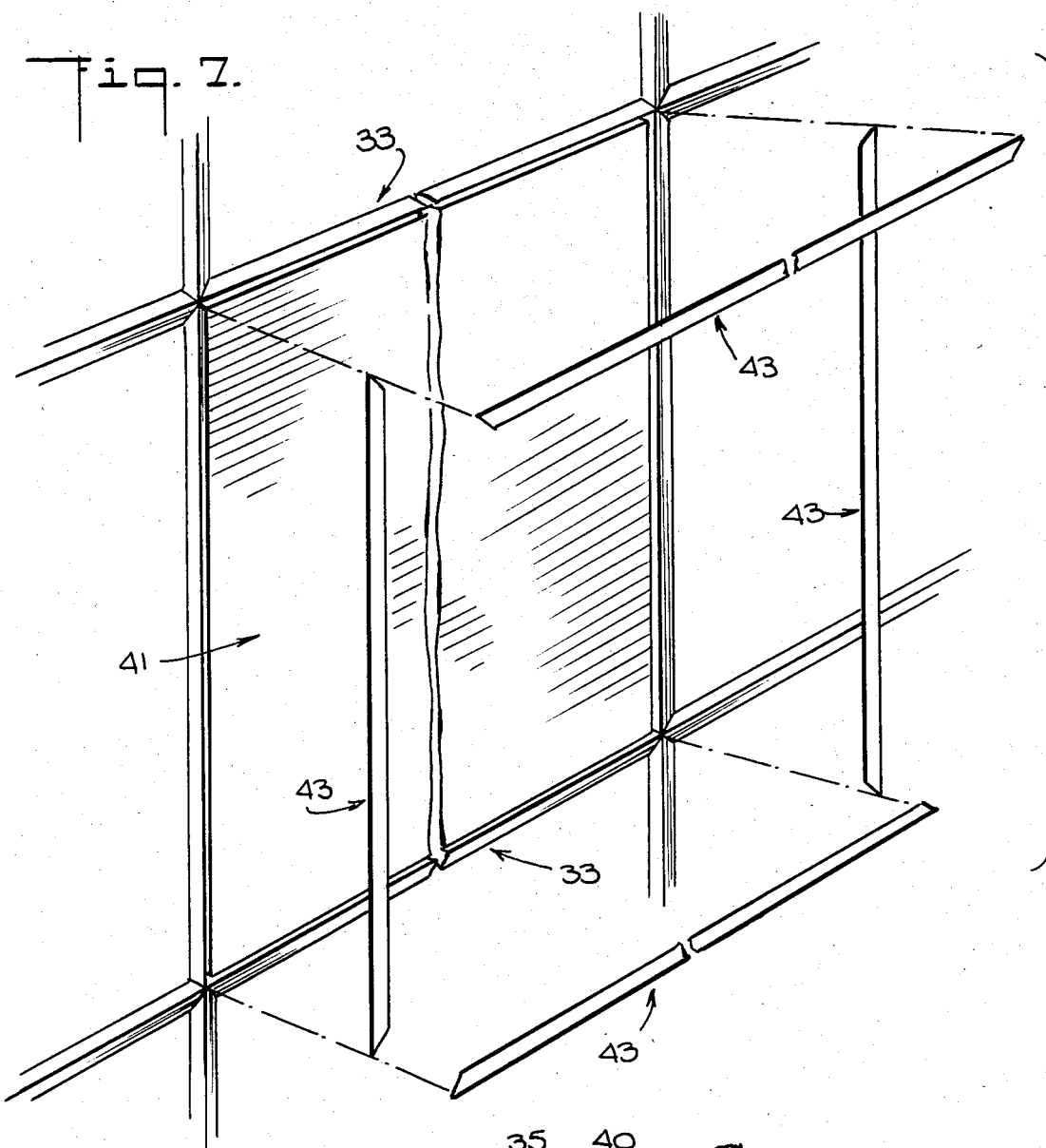
FIG. 7 is a fragmentary perspective illustration of a section of the exterior of the wall of the building, showing one of the infill panels supported by the auxiliary framework and diagrammatically illustrating the still to be performed insertion of the finishing gaskets.

Correspondingly, peripherally along its face directed outwardly of the building, each infill panel 41 is engaged and retained in place by four high strength finishing gaskets or sealing strips 43 of generally L-shaped cross-section. Alternatively, in place of each such set of four gaskets, a single gasket, in the shape of a closed rectangular loop can be used. The arrangement is such that each gasket has a foot 43a adapted to be received in one of the channels 36 of a framework member support portion 34 and to be firmly albeit releasably retained therein by the interlocking action of the teeth or serrations on the channel walls and a corresponding set of teeth on the opposite faces of the foot of the gasket, a limb 43b extending transversely from the foot and adapted (when the foot is in the channel) to overlie the proximate edge region of the outward face of an associated infill panel 41, and a rib 43c extending from the free edge of the limb 43b generally codirectionally with the foot 43a and adapted to bear against and pressingly engage the outwardly directed face of the panel so as to be in firm contact therewith and to maintain the inwardly directed face of the panel in firm contact with the corresponding gasket or sealing strip 42. As schematically indicated in FIG. 7, the finishing gaskets 43 are also mitered at their opposite ends.

Referring further to FIG. 8, at each corner of the building, although the use of appropriately molded and angle-shaped infill panels corresponding to the infill panels 41 would be feasible, for the sake of simplicity it is preferred the respective corner infills 44 have the form of an angle section or shape 44a of sheet metal (e.g. 6 mm thick sheet steel) suitably laquered and/or otherwise decoratively finished on its exterior surface and having bonded or otherwise secured to its interior surface an appropriately thick layer 44b of insulation (e.g. a batt of rock wool or comparable fibrous material, a block of foam plastic, or the like). Each corner infill 44 is mounted in place between two proximate support portions 34 by means of a pair of adapters 45. The adapters are each in the form of an angle shape, e.g. a right angle section, of sheet metal, i.e. steel, having one leg 45a secured by bolts or rivets 45b to an end region of the sheet metal section 44a and having its other leg 45c provided with an external rib or projection 45d adapted to be received and anchored in one of the notches or recesses 38 in the proximate support portion shoulder 34a. As in the case of the infill panels 41, each corner infill 44 is peripherally engaged and sealed at its exterior face by the ribs 43c of a set of finishing gaskets 43 mounted as previously described.

The infills which are designated 46 in FIG. 5 (see also FIG. 9) are composite window and glazing structures. Each such strucuture (the adjacent pairs thereof shown in FIG. 5 are, it will be apparent, mirror image duplicates of each other) includes a rectangular rigid frame 47 in one section 47a of which a casement window 48, including, for example, a clear glass window pane 49 carried in a suitably insulated fashion by a subframe 50, is movably mounted by appropriate slide and swivel joints 51. The second frame section 47b constitutes a glazing panel 52 and includes, for example, a glass pane 53 bronzed or otherwise tinted for sun glare elimination and fixedly carried in a suitably insulated fashion by the frame section 47b. The peripheral edge or boundary structure 47c of the frame 47 defines at its portions 47d and 47e the interiorly and exteriorly directed face regions of the infill 46 which are engageable, respectively, by the interior sealing strips or gaskets 42 mounted in the flange notches 39 of the auxiliary framework members 33 and the ribs 43c of the exterior finishing gaskets 43 mounted in the channels 36 of the support portions 34 of the auxiliary framework members 33.

Figure 9:
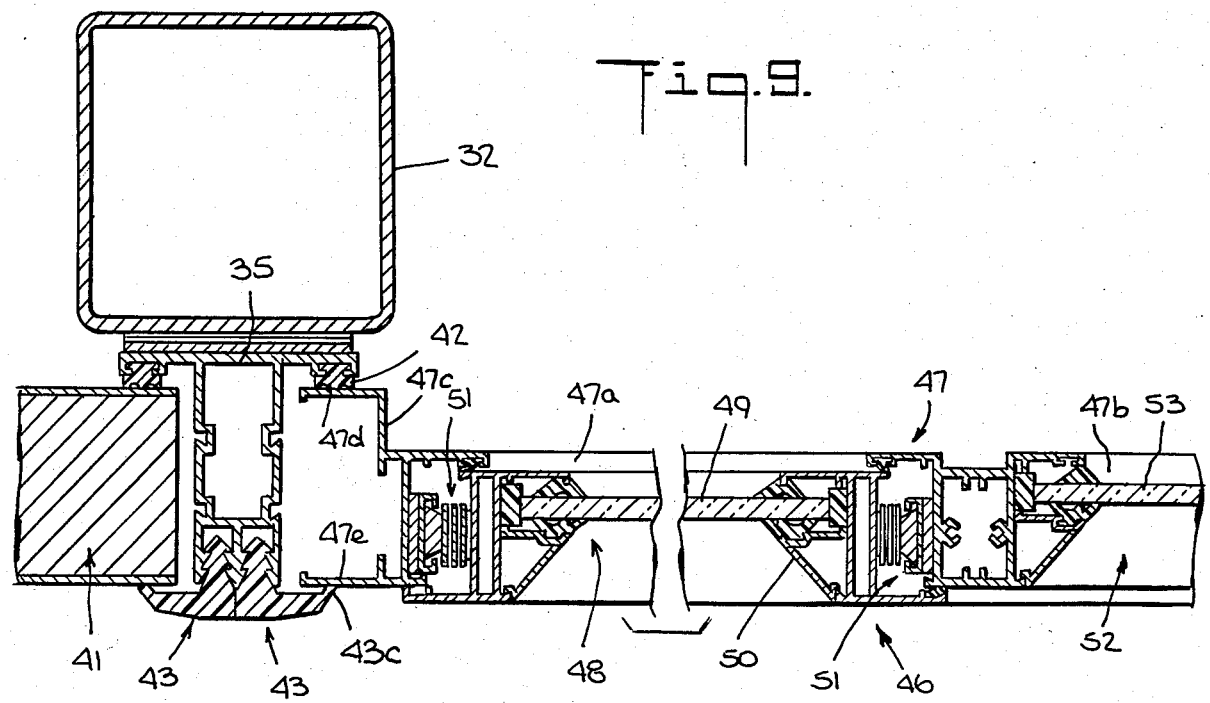
FIG. 9 is a fragmentary sectional view, taken along the line 9—9 in FIG. 5, of a medial region of the building wall including an opaque infill and a glazing infill with a venting and a stationary section.

The infills which are designated 54 in FIG. 5 (see also FIG. 10) are full-size glazing panels which, except for their size, are identical to the glazing panel 52 shown in FIG. 9. Each of the glazed panes 55, therefore, is carried by a respective one-section frame 56 the peripheral edge or boundary structure 56a of which is identical to that designated 47c in FIG. 9. The manner of mounting of the infills 54, being identical in all respects to the manner of mounting of the infill 46, thus requires no further discussion at this point.

Figure 11:
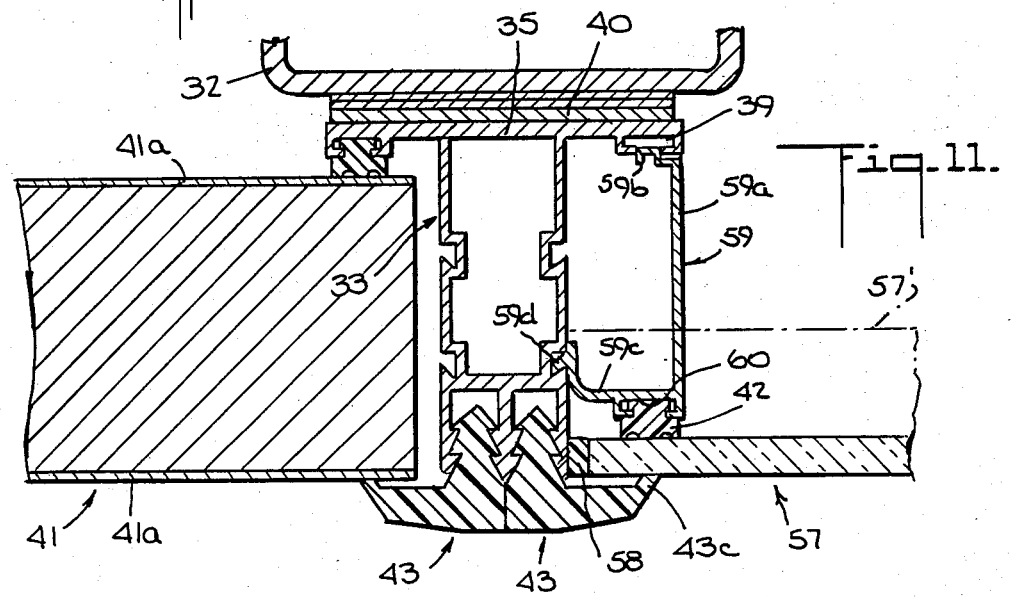
FIG. 11 (found on the same sheet as FIG. 7) is a sectional view, taken along the line 11—11 in FIG. 5, of a portion of the building wall having adjacent infills of different thicknesses and illustrates a different type of adapter used with the infill-mounting framework member to accommodate the thinner panel.
Figure 10:
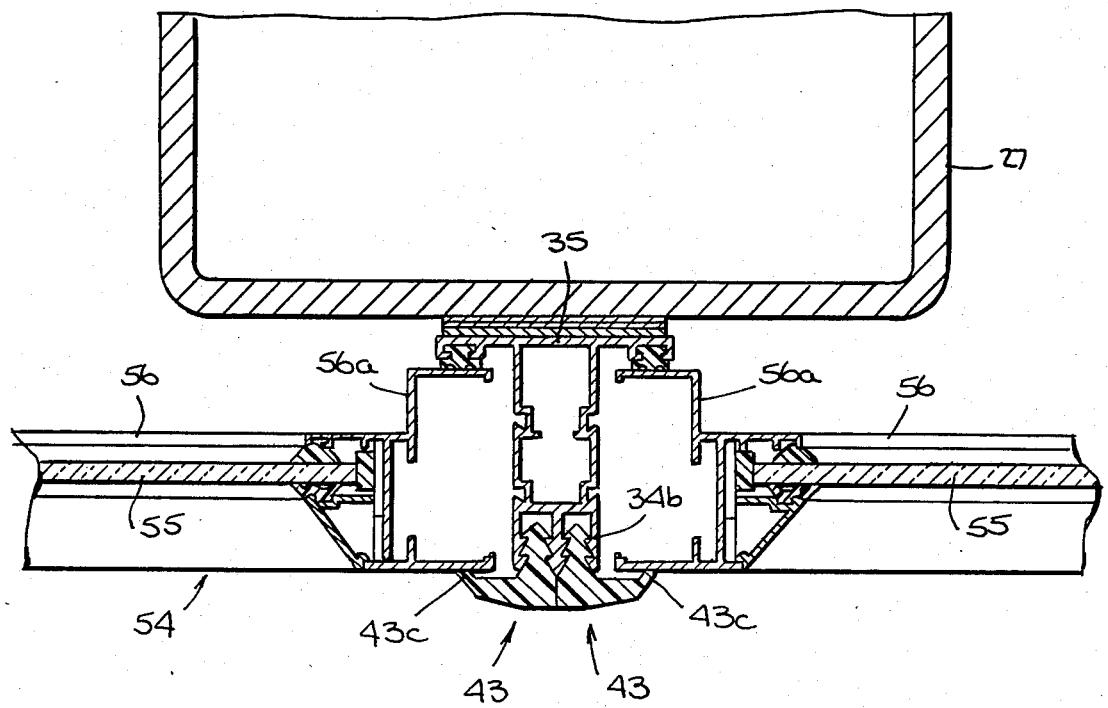
FIG. 10 is a fragmentary sectional view, taken along the line 10—10 in FIG. 5, and illustrates infills in the form of fixed glazing panels mounted in the auxiliary framework with the aid of one type of adapter.

In certain instances it may be desired to mount adjacent each other, albeit separated by an auxiliary framework member 33 of the same construction and size as hereinbefore described, a full thickness infill such as those designated 41 in FIGS. 5, 8 and 9 and a considerably thinner infill such as those designated 52 and 55 in FIGS. 5, 9 and 10, without however utilizing for the thinner infill a frame including an integral full thickness peripheral boundary structure such as those designated 47c and 56a in FIGS. 9 and 10. An arrangment for achieving this goal by a construction in accordance with a modified embodiment of the present invention is represented in FIG. 11.

As there shown, the full thickness infill 41 and its manner of mounting in the auxiliary framework are as previously described, and that description thus requires no repetition. The thinner infill 57, on the other hand, which may be a glazing panel, for example, and may be of either the minimum thickness shown in solid lines or of an intermediate thickness represented by the dot-dash line 57', is not mounted in a frame but rather merely has a peripheral protective rim element 58 provided at the edges of the panel. To accommodate an infill 57 or 57', therefore, the present invention contemplates the provision of a suitable adapter, e.g. an elongated spring steel clip or spacer member 59 in two different sizes but each being generally L-shaped in cross-section. In either case the clip or spring member has at one end of the leg 59a of the L a longitudinal rib 59b adapted to be received and seated in the notch or recess structure 39 of the flange 35 of the framework member 33. On the base 59c of the L where it adjoins the leg 59a, the clip or spacer member 59 has a notch or recess structure 60 corresponding to the flange notch 39 and adapted to receive an interior sealing gasket strip 42, while at the free edge of the base 59c the clip or spacer member has a longitudinal rib or projection 59d adapted to be received and seated in one or the other (depending on the length of the leg 59a of the L) of the notches or recesses 38 provided in the shoulder 34a of the framework member support portion 34. A set of four clips 59 of either size located peripherally of an infill 57 or 57' thus serves to occupy that portion of the space exteriorly of a set of flanges 35 of the associated four framework members 33 which is not occupied by that reduced-thickness infill and thereby properly locates the sealing strips 42 where they can be pressingly engaged by the interiorly directed face of the infill when the exteriorly directed face thereof is pressingly engaged by the ribs 43c of the associated finishing gaskets 43. It will be understood, in this regard, that in order to place the clips or spacer members 59 in position, the ribs 59b and 59d thereof can be either slid longitudinally into the respective desired notches 39 and 38, or the ribs 59b can be first set in place in the notches 39 and the legs 59c of the L then flexed to spring the ribs 59d laterally into the appropriate ones of the notches 38.

It will be clear to those skilled in the art, of course, that although the foregoing description has focussed principally on a curtain wall system in which rectangular infills are all mounted sideways in the auxiliary framework, i.e. with their longer dimensions oriented horizontally, the principles of the present invention are equally applicable to a system in which rectangular infills are mounted upright, i.e. with their longer dimensions oriented vertically, as well as to a system in which square infills are used. By the same token, although the wind posts have been described as installed vertically, they could also be disposed horizontally. Also, although they have not been illustrated for the sake of simplicity, doorways would be provided for as needed. Still further, the system of the present invention could be modified, where necessary to meet local fire safety requirements, by the introduction of metallic rods or plates suitably installed, as described in my aforesaid prior applications, to take over the infill-retaining function of the finishing gaskets in the event of their being damaged or destroyed by fire.

What is claimed:
1. A low curtain walled building comprising:
(a) a foundation;
(b) a main steelwork including (i) a plurality of primary vertical columns mounted on and anchored to said foundation and spaced from one another along lines defining the periphery of the building, (ii) a plurality of sets of horizontal beams or girders secured to said primary vertical columns and defining the supports for at least one floor and the roof of the building, and (iii) a plurality of secondary vertical columns alternating with said primary vertical columns and secured to said horizontal beams or girders along said lines defining the building periphery, each said secondary vertical columns being located intermediate two adjacent primary vertical columns;

(c) an auxiliary framework supported by said main steelwork exteriorly thereof, said auxiliary framework including a plurality of elongated framework members each having (i) a hollow central support portion of substantially rectangular cross-section and having opposed side walls, (ii) a transverse web extending laterally of said central support portion at one of the longitudinal edges of the latter and to both sides thereof and defining a pair of flanges each juxtaposed to a respective one of said side walls, each of said flanges having at the surface thereof proximate to the associated side wall, a longitudinally extending recess structure defining a seat for a strip of sealing material, and (iii) a medial partition between the portions of said side walls at the other longitudinal edge of said central support portion and defining with said side walls a pair of longitudinal channels open in the direction away from said web, said framework members being arranged vertically and horizontally in a gridwork pattern, the vertical framework members being fastened at said flanges thereof each to a respective one of said primary and secondary vertical columns, and the horizontal framework members being fastened at said flanges thereof each at one end to a respective one of said primary vertical columns and at the other end to a respective next adjacent secondary vertical column, whereby the confronting side walls of the two horizontal and the two vertical central support portions of each set of four rectangularly arranged framework members together define a respective rectangular infill-receiving space;

(d) a plurality of rectangular generally planar infills to define the curtain walls of the building, one of the opposed faces of each infill providing the interior finish of the building walls and the other face of each infill providing the exterior finish of the building walls, each infill being seated on edge in a respective one of said spaces, with the lower edge of that infill supported by the associated lower horizontal central support portion, and with the peripheral edge region of said one face of each infill engaging the associated set of strips of sealing material seated in the respective recess structures of said flanges of said framework members; and (e) elongated exterior finishing gasket means for each infill, each gasket means having (i) a foot portion received in a respective one of said channels, (ii) a transverse limb portion extending laterally from said foot portion exteriorly of said respective channel over the proximate marginal region of said other face of the associated infill, and (iii) a rib at the remote edge of said limb portion engaging and pressing against said other face of said associated infill, whereby each said finishing gasket means locks said associated infill in place in its respective space and seals the junctures between the edges of that infill and the associated four central support portions of said framework members.

2. A building as claimed in claim 1, wherein each of said primary and secondary vertical columns is a square section having one of its sides located on a respective one of said lines defining the periphery of the building, and said framework members are fastened to the respective primary and secondary vertical columns at said one side of the same.

3. A building as claimed in claim 1, wherein the remote faces of said side walls of said central support portion of each framework member are provided each with at least one additional recess structure defining a seat for an adjunct of an infill-positioning adapter.

4. A building as claimed in claim 3, wherein at each corner of the building the respective vertical column has said one side thereof located on one of said lines defining the periphery of the building and a next adjacent side located on the contiguous perpendicular one of said lines, an associated pair of framework members are fastened respectively, one to said one side and the other to said next adjacent side of said respective vertical column, each infill at a corner of the building is a right angle section extending substantially from a side wall of said central support portion of said one framework member past the vertical edge of said respective vertical column at the juncture of said one side and said next adjacent side thereof and to the proximate side wall of said central support portion of said other framework member, and respective adapters are connected to said right angle section at the opposite ends thereof, each said adapter having a projection received and seated in said additional recess structure of the proximate central support portion side wall, and said projections being retained in said additional recess structures by the pressures exerted on said right angle section by the associated finishing gasket means.

5. A building as claimed in claim 1, wherein the remote faces of said side walls of said central support portion of each framework member are provided each with a plurality of additional recess structures defining respective seats for corresponding adjuncts of different sized infill-positioning adapters.

6. A building as claimed in claim 3, further comprising, for use with an infill which is thinner than the width of said central support portion of a framework member from said one longitudinal edge of the latter to the other, a plurality of adapters each having a generally L-shaped cross-section with a leg and a base, a first projection at the free end of the leg of the L adapted to be received in said recess structure of a framework member flange, and a second projection at the free end of the base of the L adapted to be received in said additional recess structure of said framework member central support portion, each adapter further having on the outside of the base of the L adjacent its juncture with the leg of the L a further recess structure corresponding to said recess structure of said framework member flange for receiving a strip of sealing material.

* * * * *